(12) United States Patent
Taylor et al.

(10) Patent No.: US 10,586,205 B2
(45) Date of Patent: Mar. 10, 2020

(54) APPARATUS AND METHOD FOR MONITORING STOCK INFORMATION IN A SHOPPING SPACE

(71) Applicant: Walmart Apollo, LLC, Bentonville, AR (US)

(72) Inventors: Robert J. Taylor, Rogers, AR (US); Aaron J. Vasgaard, Rogers, AR (US); Nicholaus A. Jones, Fayetteville, AR (US); Matthew A. Jones, Bentonville, AR (US)

(73) Assignee: Walmart Apollo, LLC, Bentonville, AR (US)

(*) Notice: Subject to any disclaimer, the term of this patent is extended or adjusted under 35 U.S.C. 154(b) by 153 days.

(21) Appl. No.: 15/395,478

(22) Filed: Dec. 30, 2016

(65) Prior Publication Data
US 2017/0193436 A1    Jul. 6, 2017

Related U.S. Application Data

(60) Provisional application No. 62/316,341, filed on Mar. 31, 2016, provisional application No. 62/273,103, filed on Dec. 30, 2015.

(51) Int. Cl.
*G06Q 10/08* (2012.01)
*G01S 3/80* (2006.01)

(52) U.S. Cl.
CPC ............. *G06Q 10/087* (2013.01); *G01S 3/80* (2013.01)

(58) Field of Classification Search
CPC ................................ G06Q 10/087; G01S 3/80
See application file for complete search history.

(56) References Cited

U.S. PATENT DOCUMENTS 5,442,343 A    8/1995    Cato
5,471,195 A    11/1995   Rickman
(Continued)

FOREIGN PATENT DOCUMENTS

CN    203091296 U    7/2013
CN    204270349 U    4/2015
(Continued)

OTHER PUBLICATIONS

"Real-Time Secure Smart Shelf Management for Supermarkets". Sharma et al. International Journal of Advanced Research in Electronics and Communication Engineering (IJARECE). vol. 5, Issue 7, Jul. 2016. (Year: 2016).*

(Continued)

*Primary Examiner* — Nathan A Mitchell
(74) *Attorney, Agent, or Firm* — Fitch, Even, Tabin & Flannery LLP

(57) ABSTRACT

Systems, apparatuses and methods are provided herein for monitoring stock information in a shopping space. A system for monitoring stock information in a shopping space comprises: a support structure configured to hold a plurality of items in the shopping space, a sound emitter device configured to produce a sound in response to a movement of at least one of the support structure and an item placed on the support structure, and a sound sensor configured to capture a sound produced by the sound emitter device and transmit the sound produced by the sound emitter device to a stock tracking system.

18 Claims, 8 Drawing Sheets

(56) References Cited

U.S. PATENT DOCUMENTS

| | | | | |
|---|---|---|---|---|
| 6,341,271 | B1* | 1/2002 | Salvo | G06Q 10/087 705/28 |
| 7,061,381 | B2* | 6/2006 | Forcier | A01K 15/023 340/568.1 |
| 7,233,241 | B2* | 6/2007 | Overhultz | A47F 10/02 211/59.2 |
| 7,305,467 | B2 | 12/2007 | Kaiser | |
| 7,661,545 | B2 | 2/2010 | Hardy | |
| 7,676,145 | B2 | 3/2010 | Kuberka | |
| 7,777,632 | B2 | 8/2010 | Elwell | |
| 7,982,622 | B2 | 7/2011 | Burchell | |
| 7,996,256 | B1 | 8/2011 | Anand | |
| 8,229,781 | B2 | 7/2012 | Zenor | |
| 8,416,299 | B2 | 4/2013 | Moore | |
| 8,676,377 | B2 | 3/2014 | Siegel | |
| 9,367,831 | B1* | 6/2016 | Besehanic | G06Q 10/087 |
| 9,911,290 | B1 | 3/2018 | Zalewski | |
| 10,169,660 | B1 | 1/2019 | Ren | |
| 2006/0013070 | A1* | 1/2006 | Holm | G01S 5/0081 367/128 |
| 2006/0192668 | A1 | 8/2006 | Friar | |
| 2007/0033382 | A1 | 2/2007 | Mandalia | |
| 2007/0199863 | A1 | 8/2007 | Knoettgen-Nap | |
| 2008/0004951 | A1 | 1/2008 | Huang | |
| 2008/0077510 | A1 | 3/2008 | Dielemans | |
| 2008/0270249 | A1 | 10/2008 | Rosenbaum | |
| 2009/0248198 | A1* | 10/2009 | Siegel | G06Q 10/08 700/231 |
| 2010/0169189 | A1 | 7/2010 | Allison | |
| 2011/0029342 | A1 | 2/2011 | Wolinsky | |
| 2011/0055103 | A1* | 3/2011 | Swafford, Jr. | A47F 1/126 705/345 |
| 2011/0210084 | A1 | 9/2011 | Hardy | |
| 2012/0091162 | A1* | 4/2012 | Overhultz | A47F 1/126 221/1 |
| 2012/0295560 | A1* | 11/2012 | Mufti | H04B 13/00 455/95 |
| 2013/0090996 | A1 | 4/2013 | Stark | |
| 2013/0173435 | A1 | 7/2013 | Cozad | |
| 2013/0233922 | A1* | 9/2013 | Schoening | G06Q 10/087 235/385 |
| 2013/0235206 | A1 | 9/2013 | Smith | |
| 2014/0184818 | A1* | 7/2014 | Argue | G06Q 10/087 348/207.1 |
| 2014/0201041 | A1* | 7/2014 | Meyer | G06Q 10/087 705/28 |
| 2014/0313328 | A1 | 10/2014 | Park | |
| 2014/0365272 | A1 | 12/2014 | Hurewitz | |
| 2014/0365333 | A1 | 12/2014 | Hurewitz | |
| 2014/0367401 | A1* | 12/2014 | Stralin | A47K 10/22 221/6 |
| 2015/0066497 | A1 | 3/2015 | Sun | |
| 2015/0088306 | A1* | 3/2015 | Varrasso | G06Q 20/203 700/236 |
| 2015/0220764 | A1 | 8/2015 | Pudenz | |
| 2015/0365384 | A1* | 12/2015 | Rider Jimenez | H04L 63/0435 705/77 |
| 2016/0132822 | A1* | 5/2016 | Swafford | H04W 4/80 705/28 |
| 2017/0293880 | A1* | 10/2017 | Taylor | G06Q 10/087 |
| 2018/0144288 | A1* | 5/2018 | Sayed | G06Q 10/087 |

FOREIGN PATENT DOCUMENTS

| | | |
|---|---|---|
| WO | 2003049057 | 6/2003 |
| WO | 2014102797 | 7/2014 |

OTHER PUBLICATIONS

"RFID-based smart shelving storage systems". Author: Andrea D'Alessandro. PhD Thesis Unviersity of Pisa. 2014. (Year: 2014).*

"Smart Shelves for Retail: Redefine your In-Store Experience". Happiest Minds. Retrieved from <https://www.happiestminds.com/wp-content/uploads/2016/06/Smart-Shelves-for-Retail-Redefine-your-In-Store-Experience.pdf> on Mar. 13, 2019. Originally published Jun. 2016. (Year: 2016).*

Introducing Smart Shelf. Newave Sensor Solutions. Retrieved from <http://www.newaverfid.com/Portais/0/Resources/NeWave_SS_Overview_Dec_2015.pdf> on Mar. 13, 2019. Dec. 2015. (Year: 2015).*

PCT; PCT App. No. PCT/US2017/052617; International Search Report and Written Opinion dated Dec. 1, 2017.

Girgensohn, Andreas, et al.; "Determining Activity Patterns in Retail Spaces through Video Analysis", Texas A&M University, 2008, pp. 1-4.

U.S. Appl. No. 15/709,116; Notice of Allowance dated Jun. 10, 2019; (pp. 1-14).

U.S. Appl. No. 15/709,116; Notice of Allowance dated Nov. 8, 2019; (pp. 1-15).

* cited by examiner

APPARATUS AND METHOD FOR MONITORING STOCK INFORMATION IN A SHOPPING SPACE

CROSS-REFERENCE TO RELATED APPLICATIONS

This application claims the benefit of U.S. Provisional Application No. 62/273,103, filed Dec. 30, 2015, and U.S. Provisional Application No. 62/316,341, filed Mar. 31, 2016, which are incorporated herein by reference in their entirety.

TECHNICAL FIELD

This invention relates generally to store monitoring.

BACKGROUND

Shopping spaces often include a number of aisles separated by display shelves. Merchandise is typically arranged according to types and categories in the shopping space for customers to browse. Customers may remove items and return items to the shelves throughout business hours. Store associates would restock the shelves when the on-shelf inventory is low.

BRIEF DESCRIPTION OF THE DRAWINGS

Disclosed herein are embodiments of apparatuses and methods for monitoring stock information in a shopping space. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein for monitoring stock information in a shopping space. A system for monitoring stock information in a shopping space comprises: a support structure configured to hold a plurality of items in the shopping space, a sound emitter device configured to produce a sound in response to a movement of at least one of the support structure and an item placed on the support structure, and a sound sensor configured to capture a sound produced by the sound emitter device and transmit the sound produced by the sound emitter device to a stock tracking system.

Conventionally, inventory tracking systems are not configured to detect that an item is placed or removed from the top stock location on a shelf. Knowledge of items added and/or removed from a shelf may improve on-shelf availability, sales, and productivity of a store.

In some embodiments of systems, methods, and apparatuses describe herein, sound sensors may be placed around the sales floor to record sounds of items being placed on different stock locations. Display shelves may include sound emitters that are activated when force is applied to shelves to generate a sound inside and/or outside of human audible frequencies. Locations associated with item movements may be calculated based on directional sound detection. The system may record the data points of activity being performed on the sales floor and sounds of items being placed on shelves to create a product location and activity map. Items removed from the shelves could also be detected to derive on-shelf stock information of an item. Additionally, the sound of glass breaking may also be detected by the sound sensors and the system may trigger a cleanup task assignment in response.

Figure 1:
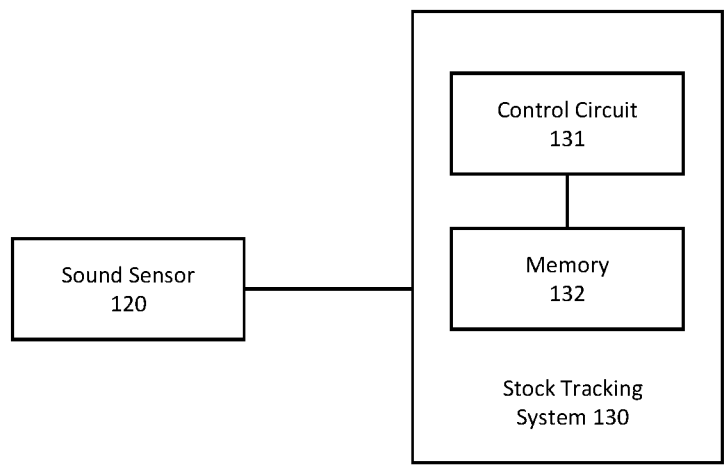
FIG. 1 is a block diagram of a system in accordance with several embodiments.
Figure 1:
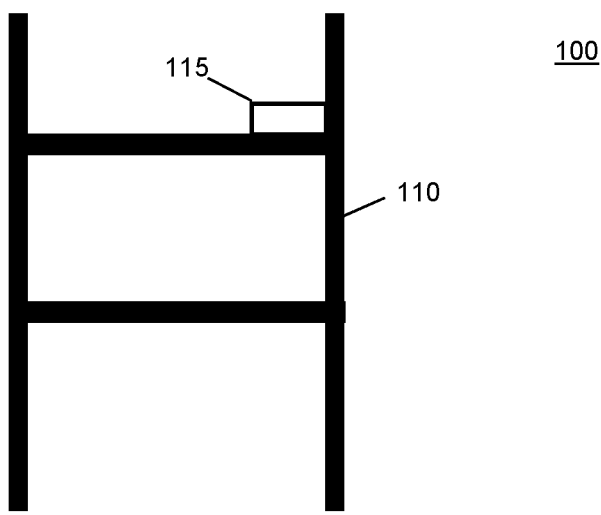

Referring now to FIG. 1, a system for monitoring stock information in a shopping space is shown. The system 100 includes a stock tracking system 130, a sound sensor 120, and a sound emitter device 115 coupled with a support structure 110.

The support structure 110 may generally be configured to hold a plurality of items in a shopping space. In some embodiments, the support structure 110 may comprise one or more of a shelf, stand, a case, a module, a refrigerator unit, and the like. The support structure 110 may include one or more vertically and/or horizontally adjacent storage compartments each configured to hold items and may include a riser portion on top of the support structure. In some embodiments, the support structure may hold and display one or more items to make the items available for customers to retrieve and purchase in a shopping space. In some embodiments, the riser portion may be used to store bulk packages used for restocking lower shelves that are more easily accessible to customers. In some embodiments, the support structure may be coupled to a fixture (e.g. an upright panel) at two support points, the first support point being positioned near the top of the support structure and the second support point being lower than the first support point. When an item is placed on the support structure, the lower portion of the support structure may pivot backward towards the fixture, with the first support point as the fulcrum of the movement. In some embodiments, the support points may comprise peg hooks that hook onto an upright panel to hang the support structure. A sound emitter may be placed in or near a lower peg hook of the support structure and be actuated by the change in the distance between the support structure and the upright panel as the support structure pivots relative to the location of the top peg hook. In some embodiments, the support structure 110 may pivot slightly forward and/or backward relative to the ground when a store associate and/or a customer interact with items on the support structure. For example, when an item is placed and pushed into the support structure 110, the friction between the item and the support structure and/or the force applied to the item may cause the support structure 110 to tilt backward from a generally vertical and upright position. When an item pulled forward and removed from the support structure, the friction between the item and the support structure and/or the force applied to the item may cause the support structure 110 to tilt forward from a generally vertical position. In some embodiments, the support structure 110 may return to the generally vertical position once the force (e.g. push or pull) applied to the item is removed due to the support structure's center of gravity and/or a spring device attached to the support structure to keep the support structure upright. In some embodiments, the support structure 110 may pivot only when a store associate and/or customer interact with an item in some compartments of the support structure 110. For example, the support structure 110 may only noticeably tilt forward or backward when items are placed and/or removed from the riser portion (e.g. on top of the shelf) and/or top few shelves of the support structure 110. In some embodiments, the support structure 110 may pivot slightly forward and backward and/or lower based on the weight of the items on the support structure. For example, when items are placed on the top compartments of the support structure 110, the support structure 110 may tilt backward and/or sink lower from the weight of the items. The support structure 110 may return to the original position once the weight of the item is removed.

The sound emitter device 115 may comprise a device configured to produce a sound in response to the movement of the support structure 110 and/or an item placed on the support structure. While the sound emitter device 115 is shown to be coupled to a vertical portion of the top compartment of the support structure 110 in FIG. 1, in some embodiments, the sound emitter device 115 may be coupled to other parts of the support structure 110 such as to a lower compartment, to a vertical portion, etc. In some embodiments, a support structure 110 may include a plurality of sound emitter devices coupled to different portions of the support structure 110. In some embodiments, the sound emitter device 115 may be configured to produce a sound based on the movement of the support structure 110 relative to a fixed structure such the floor, a wall, a pillar, and a divider, and/or another support structure. For example, the sound emitter device 115 may be actuated when a gap between two support structures narrows and/or widens. In some embodiments, the sound emitter device 115 may be configured to produce a sound based on the movement of an item relative to the support structure 110. For example, the sound emitter device 115 may be configured to be actuated by contact with an item as the item is placed and/or removed from the support structure. In some embodiments, the sound emitter device 115 may be configured to produce different sounds based on the direction of an item's movement. For example, a first sound may be produced when a forward movement is detected and a second sound may be produced when a backward movement is detected.

In some embodiments, the shopping space includes a plurality of support structures each having a sound emitter that is configured to make a distinguishable sound. For example, each sound emitter may produce a sound that is distinguishable based on its sound characteristics such as sound frequency, tone, modulation, duration etc. In some embodiments, a sound emitter may produce two or more sound frequencies and be distinguishable based on the combination of frequencies. In some embodiments, the sound emitter device 115 may be configured to produce a sound inside the human audible frequency (e.g. 20 to 20,000 Hz) and/or outside of the audible frequency. In some embodiments, the sound emitter device 115 may comprise a mechanical device requiring no electricity to produce a sound. In some embodiments, the sound emitter device 115 may comprise an electric sound emitter powered by a power grid, a battery, photovoltaic cells, etc. Several embodiments of the sound emitter device 115 are described in more detail with reference to FIGS. 3A-7 herein.

The sound sensor 120 may generally be configured to capture sounds in a shopping space and transmit the sound to a stock tracking system 130. In some embodiments, the sound sensor 120 may comprise an array of sound sensor devices positioned throughout a shopping space. The sound sensor array may comprise stationary sound sensors installed in the shopping space. For example, the sound sensor array may be installed in the ceiling, pillars, beams, etc. of a shopping space. In some embodiments, the sound sensor 120 may comprise sound sensor devices tuned to a narrow band of the frequencies based on the frequency of the sound emitter devices. In some embodiments, the sound sensor 120 may comprise a plurality of directional microphones. In some embodiments, directional microphone may comprise a plurality of microphone devices each pointing away from a center of the array in a different direction. The times that a sound reaches each of the microphones in the directional microphone device may be compared to determine a direction of the sounds.

The stock tracking system 130 includes a control circuit 131 and a memory 132 and may generally be any processor-based device such as one or more of a computer system, a server, a cloud-based server, etc. The control circuit 131 may comprise a central processing unit, a processor, a microprocessor, and the like. The control circuit 131 may be configured to execute computer readable instructions stored on the memory 132. The memory 132 may comprise volatile and/or non-volatile computer readable storage memory and have stored upon it a set of computer readable instructions which, when executed by the control circuit 131, causes the system to update inventory information based on sound detected by the sound sensor 120. The stock tracking system 130 may be coupled to the sound sensor 120 via a wired and/or wireless data connection. In some embodiments, the stock tracking system 130 may be configured to process the sound collected by the sound sensor 120 to isolate sounds made by a sound emitter device such as the sound emitter device 115. The stock tracking system 130 may then be configured to identify a support structure 110 associated with the sound emitter device 115. The identification of the support structure 110 may be based one or more of the detected sound's characteristics (e.g. frequency, tone, modulation, amplitude, duration, etc.) and the location of the sound source. The location of the sound source may be determined based on performing trilateration and/or triangulation for the position of the sound emitter using sounds captured by two or more directional and/or non-directional sound sensor devices of the sound sensor 120 that are spaced apart. In some embodiments, the stock tracking system 130 may further be configured to determine whether the detected sound is associated with an item being added or removed from the support structure based on the characteristics of the sound. The stock tracking system 130 may then update an estimated stock information of the identified support structure based on the detected sound. In some embodiments, the stock tracking system 130 may record each instance that the sound emitter device 115 is activated to track the usage frequency of the support structure 110. The stock tracking system 130 may be configured to automatically generate an inspection task once the number of interactions exceeds a predetermined threshold such that a store associate and/or an automated device may be sent to the support structure 110 to determine whether an action (e.g. stock, rearrange, clean up) should be taken at the support structure 110. In some embodiments, the stock tracking system 130 may track the number of add actions and the number of remove actions for a support structure 110. If the number of remove actions exceeds the number of add actions for a predetermined threshold, the stock tracking system 130 may determine that the on-shelf stock is likely low and automatically generate a restocking task such that a store associate and/or an automated device may be sent to the support structure 110 to restock the items on the support structure 110. Generally, the estimated stock information determined based on the sound collected by the sound sensor 120 may be used to map out and analyze usage and traffic of different areas of a shopping space over time to provide a better understanding of customer shopping patterns.

Figure 2:
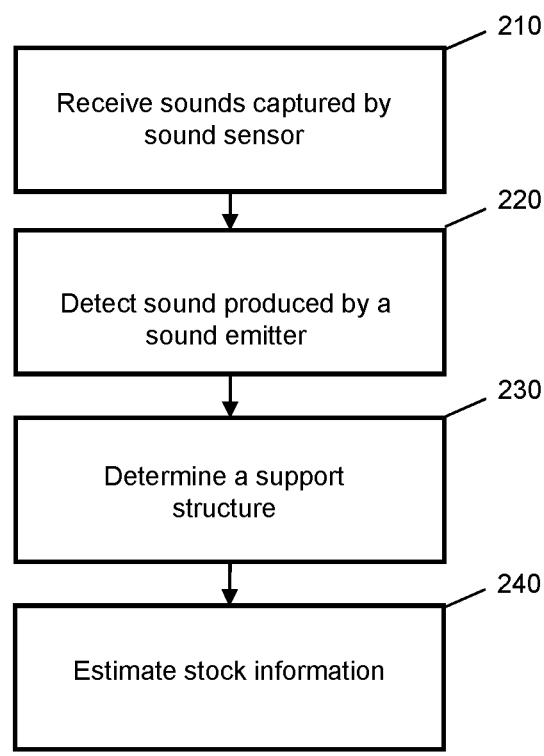
FIG. 2 is a flow diagram of a method in accordance with several embodiments.

Referring now to FIG. 2, a method for monitoring stock information in a shopping space is shown. Generally, the method shown in FIG. 2 may be implemented with a processor based device such as a control circuit, a central processor, and the like. In some embodiments, the method shown in FIG. 2 may be implemented with the stock tracking system 130 in FIG. 1.

In step 210, the system receives sounds captured by a sound sensor in a shopping space. In some embodiments, the sound sensor may comprise the sound sensor 120 described with reference to FIG. 1. The sound sensor may generally be configured to capture sounds produced by the sound emitter device and transmit the sound to a stock tracking system. In some embodiments, the sound sensor may comprise an array of sound sensor device positioned throughout a shopping space. The sound sensor array may comprise stationary sound sensors installed in the shopping space. For example, the sound sensor array may be installed in the ceiling, pillars, beams, etc. of a shopping space. In some embodiments, the sound sensor may comprise a plurality of directional microphones. In some embodiments, a directional microphone may comprise a plurality of microphones each pointing in a different direction.

In step 220, the system detects a sound produced by a sound emitter device within the sound captured by the sound sensor in step 210. The sound produced by the sound emitter device may be produced in response to a movement of at least one of a support structure configured to hold a plurality of items in the shopping space and an item placed on and/or removed from the support structure. In some embodiments, a support structure may generally refer to one or more of a shelf, stand, a case, a module, a refrigerator unit, and the like, and/or a portion thereof, such as a horizontal divider, a vertical divider, a pole, a support beam, a riser portion, a compartment, a bin, a peg hook, and the like. In some embodiments, the stock tracking system may be configured to determine a baseline noise profile of the shopping space and remove a baseline noise from the sound captured by the sound sensor to detect sounds produced by the sound emitter devices. In some embodiments, the baseline noise profile may be generated and/or updated by capturing the ambient noise of the shopping space with the sound sensors. In some embodiments, the system may be configured to filter the sound captured by the sound sensor to isolate sounds matching sound characteristics profiles associated known sound emitter devices in the shopping space. For example, the captured sound may be filtered to remove all sounds outside of the frequencies of the sound emitters. In some embodiments, the system may be configured to determine whether a sound is produced by a sound emitter based one or more of the frequency, tone, the modulation, the amplitude, and the duration of the captured sound. In some embodiments, the system may further be configured to determine whether a sound is produced by a sound emitter based on the location of the source of the sounds. For example, the system may have stored in its memory, the location of a plurality of sound emitters and sound characteristics profiles associated with each sound emitter. The system may determine that a sound is produced by a sound emitter if the sound characteristic and source location both match a known sound emitter.

In some embodiments, a sound emitter may be configured to produce a sound having a first characteristic when a movement in the first direction is detect and produce a sound having a second characteristic when a movement in the second direction is detected. For example, a sound emitter may comprise two compressible diaphragms. The first compressible diaphragm may be compressed by a backward motion of the support structure to produce a first sound and the second compressible diaphragm may be compressed by a forward movement of the support structure to produce a second sound. In some embodiments, in step 220, the stock tracking system 130 may further be configured to determine whether the detected sound is associated with an item being added (e.g. backward motion) or removed (e.g. Forward motion) from the support structure based on the characteristics of the detected sound.

In step 230, the system determines a support structure associated with the sound emitter. In some embodiments, the system may be configured to determine a support structure associated with the sound emitter producing the sound detected in step 220 based on one or more of a characteristics of the captured sound and the location of the sound source. In some embodiments, the sound emitters in a shopping space may be configured to produce a sound having distinguishable characteristics such as one or more of frequency, tone, amplitude, modulation, and duration. For example, a sound emitter on a first support structure may produce a sound having a first specific frequency and a sound emitter on a second support structure may produce a sound having a second frequency different from the first frequency. The system may have stored upon its memory, a list of sound characteristic profiles for each sound emitter coupled to a support structure in the shopping space. The system may identify the support structure associated with the captured sound based on the comparing the captured sound with the stored sound characteristics profiles of each sound emitters.

In some embodiments, the system may be configured to determine a location of the sound source with a sound sensor array. In some embodiments, the system may determine an approximate area of the sound source based on the location of sound sensor devices(s) that detected the sound. In some embodiments, the system may be configured to determine a sound source location based on trilateration and/or triangulation from the locations of two or more sound sensor devices. For example, if the two sensor sensors spaced apart from each other detects a sound having matching characteristic, the system may be configured to determine an estimated distance and/or angle between the sound source and each sound device based on the relative arrival time and/or amplitude of the sound detected at each sound sensor. In some embodiments, a direction of the sound source may be determined with:

$$\Delta t = \frac{x \sin\theta}{c},$$

in which $\Delta t$ represents arrival time difference, x represents the distance between the two sound sensors, c represents the speed of sound, and $\theta$ may be solved for the angle between the baseline of the sensors and the incident sound. In some embodiments, the determined angle from multiple sensors may be used to triangulate a point in the shopping space based on the locations of the sound sensors.

In some embodiments, the location of the sound source may be determined based on trilateration. For example, the distances between each of the sound source and each sound sensor may be determined based on the difference in time of arrival. For example, if a sound arrives at the first sound sensor device at $t_1$ and at the second sound sensor device at $t_2$ before $t_1$, and the distance between the first and second sound sensors is d3, the distance between the sound source and the first sound sensor ($d_1$) may be solved from $d_1^2 = d_3^2 + (d_1-(t_1-t_2)c)^2$, assuming that the distance between the sensors $d_3$ is smaller than $d_1$. The distance between the second sensor and the sound source may be represented by $d_2 = d_1 - (t_1-t_2)c$. With $d_2$ and $d_1$, the system may determine a circle of possible points for the sound source. If the sound emitters are generally laid out in a plane, the intersection of the plane and the circle of possible points may yield two possible locations for the sound emitters. In some embodiments, the system may similarly calculate the distance between the sound source and a third sound emitter to triangulate and narrow down the location of the sound source.

In some embodiments, the sound sensor may comprise a directional microphone having a plurality of microphones pointed in different directions. The system may determine the direction of the sound source based on the time of arrival and/or sound amplitude at each microphone device in the directional microphone. For example, the sound would first arrive at the microphone device pointed most directly at the sound source. The system may then determine a point in the shopping space based on the direction and/or distance of the sound source detected by two or more directional microphones based on either triangulation or trilateration. The system may have stored in its memory, a map of the shopping space indicating the locations of a plurality of support structures. The support structure matching the determine location of the sound source may be identified in step 230.

In some embodiments, the support structure may be identified based on one or both the characteristic and the location of the sound source. For example, the system may identify an approximate region having a plurality of support structures based on locating the sound source. The system may then identify a support structure within the plurality of support structures based on comparing the captured sound with sound characteristic of sound emitters known to be in that approximate region. In another example, two or more sound emitters in a shopping space may be configured to produce sounds with similar or identical characteristics. The system may select from sound emitters having similar or identical sound characteristics based on the sound source location to identify the associated support structure.

In step 240, the system estimates a stock information for the identified support structure based tracking the sound produced by the sound emitter. In some embodiments, the system may estimate stock information for a plurality of support structure in a shopping space based on monitoring for sounds produced by a plurality of sound emitters coupled to the support structures throughout the shopping space. In some embodiments, the stock tracking system may record each instance that the sound embittering device is activated to track the usage frequency of each support structure. The stock tracking system may be configured to generate an inspection task once the number of interactions exceeds a predetermined threshold such that a store associate and/or an automated movable device may be sent to the support structure to determine whether an action (e.g. stock, rearrange, clean up) should be taken with the support structure. In some embodiments, the stock tracking system may estimate the number of items on the support structured based on monitoring sounds produced by an associated sound emitter. In some embodiments, the stock tracking system 130 may track the number of "add item" actions and the number of "remove item" actions at a support structure 110 based on the sound produced by the sound emitter. If the number of "remove item" actions exceeds the number of "add item" actions for a threshold, the stock tracking system 130 may be configured to generate a restocking task such that a store associate and/or an automated movable device may be sent to the support structure 110 to restock the items on the support structure. Generally, the estimated stock information determined based on the sound collected by the sound sensor 120 may be used to map and analyze the usage and traffic of different areas and support structures in a shopping space over time.

In some embodiments, the system may further monitor for sound associated with a damage event such as broken glass and/or dropped item in the sound captured by the sound sensors. For example, the system may compare captured sound with sound profiles indicative of glass shattering to detect a damage event. In some embodiments, the system may determine a location of the damage event with methods similar to those described herein for determining a sound source. The system may further generate a cleanup task for a store associated and/or an automated cleaner device in response to detecting a damage event.

Figure 3A:
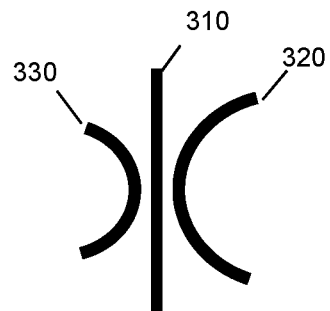
FIGS. 3A, 3B, 3C, 4A, 4B, 5A, 5B, 6A, 6B and 7 are illustrations of several sound emitter devices in accordance with several embodiments.

Next referring to FIGS. 3A-7, illustrations of several embodiments of sound emitter devices are shown. In FIGS. 3A-C, a sound emitter comprising a pair of diaphragms is shown. The sound emitter includes a first diaphragm 330, a second diaphragm 320, and an actuator 310. The actuator 310 may be part of the sound emitter device coupled to a support structure for holding items in a shopping space and/or part of the support structure. The first diaphragm 330 and the second diaphragm 320 may each comprise a semi-flexible material that maintains a first state when no force is applied, and may be compressed to produce a sound when a force is applied. In some embodiments, the first diaphragm 330 and the second diaphragm 320 may comprise one or more of metal, rubber, plastic, silicon, etc. In some embodiments, each diaphragm may be made to produce a distinguishable sound. For example, the characteristics (e.g. frequency, tone, modulation, duration, etc.) of the sound produced by the compression of a diaphragm may be varied based on varying one or more of the diameter, material thickness, curvature, shape, etc. of the diaphragm. A stock tracking system may then determine the movement direction of the actuator 310 based on determining whether a detected sound is produced by the first diaphragm 330 or second diaphragm 320. In some embodiments, the first diaphragm 330 and second diaphragm 320 may each be coupled to a structure that remains generally fixed relative to the ground. In some embodiments, the first diaphragm 330 and the second diaphragm 320 may be coupled to the floor, a wall, a pillar, another support structured, etc.

Figure 3B:
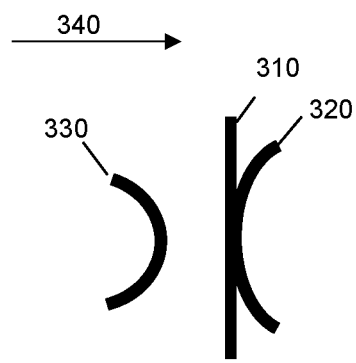
Figure 3C:
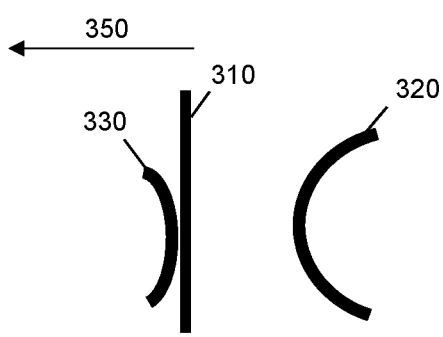

In FIG. 3A, the actuator 310 coupled to support structure is in a neutral state in which no detectable force is applied in either direction. In FIG. 3B, a force 340 is applied in a backward direction to cause the actuator 310 to compress the second diaphragm 320. The force 340 may be caused by an item being placed on the support structure. The actuator 310 may be actuated by direct contact with the item and/or by the movement of the support structured due to the movement of the item. In some embodiments, after the force 340 is removed, the actuator 310 may return to the neutral state shown in FIG. 3A. In FIG. 3C, a force 350 is applied in a forward direction to cause the actuator 310 to compress the first diaphragm 330. The force 340 may be caused by an item being removed from on the support structure. In some embodiments, after the force 350 is removed, the actuator 310 may return to the neutral state shown in FIG. 3A. In some embodiments, the actuator 310 may be coupled to one or more springs configured to return the actuator 310 back to the neutral state in the absence of detectable force. In some embodiments, the actuator 310 may return to the neutral state due to the support structure's center of gravity. In some embodiments, the first diaphragm 330 and/or the second diaphragm 320 may also produce a sound when the diaphragm returns from a compressed state to a neutral state. In some embodiments, the stock tracking system may distinguish between the first diaphragm 330 and the second diaphragm 320 and other diaphragms attached to other support structures based on one or more of the sound produced during compression of the diaphragm and the decompression of the diaphragm.

Figure 4A:
Figure 4B:
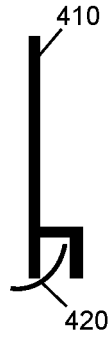

Next referring to FIGS. 4A-B, a sound emitter device comprising a bendable foil is shown. The sound emitter device includes a foil 420 and an actuator 410. The actuator 410 may be part of the sound emitter device coupled to a support structure and/or part of the support structure. In some embodiments, the foil 420 may comprise a semi-flexible material that maintains a first state when no force is applied, and may be bend to produce a sound when a force is applied. In some embodiments, the foil 420 may comprise one or more of metal, rubber, plastic, silicon, etc. In some embodiments, the foil 420 may be made to produce a distinguishable sound. For example, the characteristics of the sound produced by the compression of a foil may be varied based on varying one or more of the foil's shape, size, material thickness, etc. A stock tracking system may then distinguish foils coupled to different support structures based on their sound characteristics. In some embodiments, the foil 420 may be configured to produce a second sound when it returns from a bent state to a neutral state. When an item is placed on a support structure and a backward force and/or downward is applied to the actuator 410, in FIG. 4B, the foil 420 may bend to produce a sound. In some embodiments, when the force applied to the item being placed on the support structure is removed, the actuator 410 and the foil 420 are configured to return to the neutral state shown in FIG. 4A. In some embodiments, the actuator 410 may be actuated by the weight of the item, and the foil 420 may return to the neutral state shown FIG. 4A when the weight of the item is removed. In some embodiments, the actuator 410 may at least partially return to the neutral state due to the elasticity of the foil 420. In some embodiments, the foil 420 may be coupled to a structure that remains generally fixed to the ground. In some embodiments, the foil 420 coupled to the floor, a wall, a pillar, another support structured, etc. In some embodiments, the foil may be to the support structure on one end and another fixed structure on the other end, such that the foil is bent by the narrowing of the gap between the support structure and the fixed structure to produce a sound. In some embodiment, a sound emitter may include a second foil that may be actuated by an actuator in the opposite direction of movement.

Figures 5A, 5B:
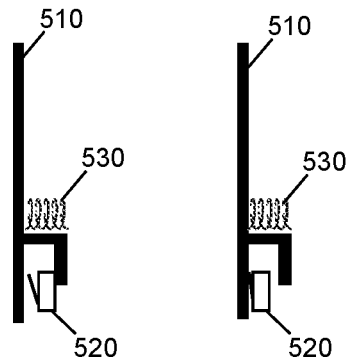

Next referring to FIGS. 5A-B, a sound emitter device comprising a clicker is shown. The sound emitter device includes a clicker 520, an actuator 510, and a spring 530. The actuator 510 may be part of the sound emitter device coupled to a support structure for holding items in a shopping space and/or part of the support structure. In some embodiments, the clicker 520 may include a lever that strikes a sound element. In some embodiments, the clicker 520 may be configured to produce a distinguishable sound. For example, the characteristics of the sound produced by the clicker 520 may be varied based on varying one or more of the size, shape, and thickness of the lever and/or the sound element of the clicker 520. A stock tracking system may then distinguish clickers coupled to different support structures based on their respective sound characteristics. When an item is placed on a support structure and a backward force and/or downward is applied to the actuator 510, in FIG. 5B, the clicker 520 may be actuated to produce a sound. In some embodiments, when the force applied to the item being placed on the support structure is removed, the actuator 510 may be configured to return to the neutral state shown in FIG. 5A. In some embodiments, the spring 530 may be configured to hold the actuator in the neutral position unless a force sufficient to overcome the force of the spring is applied to the actuator. In some embodiments, the actuator 510 may be actuated by the weight of the item, and the actuator 510 may return to the neutral state shown in FIG. 5A when the weight of the item is removed. In some embodiments, the clicker 520 may be coupled to a structure that remains generally fixed to the ground. In some embodiments, the clicker 520 may be coupled to the floor, a wall, a pillar, another support structured, etc. In some embodiment, a sound emitter may include a second clicker that may be actuated in the opposite direction of movement.

Figure 6A:
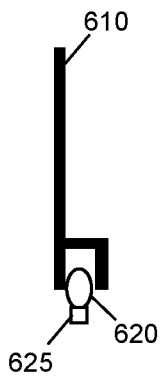
Figure 6B:
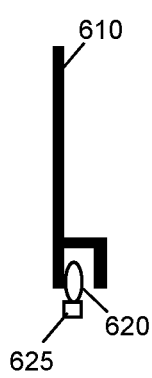

Next referring to FIGS. 6A-B, a sound emitter device comprising an air bladder is shown. The sound emitter device includes an airbladder 620, a two way air valve 625, and an actuator 610. The actuator 610 may be part of the sound emitter device coupled to a support structure for holding items in a shopping space and/or part of the support structure. In some embodiments, the airbladder 620 may be configured to be compressed by the actuator 610 to push air through the two way air valve 625. The two way air valve 625 may produce a first sound when air leaves the airbladder 620 and a second sound when air enters the airbladder. In some embodiments, the two way air valve 625 may be configured to produce distinguishable sounds. For example, the characteristics of the sound produced by the two way air valve 625 may be varied based on varying one or more of the size and shape of the airbladder 620 and the one or more openings of the two way air valve 625. A stock tracking system may distinguish airbladders and air valves coupled to different support structures based on their sound characteristics. When an item is placed on a support structure and a backward force and/or downward force is applied to the actuator 610, in FIG. 6B, the airbladder 620 may be compressed to produce a sound through the two way air valve 625. In some embodiments, when the force applied to the item being placed on the support structure is removed, the actuator 610 may be configured to return to the neutral state shown in FIG. 6A. In some embodiments, the actuator 610 may be actuated by the weight of the item, and the actuator 610 may return to the neutral state shown in FIG. 6A when the weight of the item is removed. In some embodiments, the airbladder 620 may expand back to the neutral 620 in the absence of the force from the actuator. As the airbladder 620 expands, air may pass through the two way air valve 625 to produce a second sound detectable by the stock tracking system. In some embodiments, the two way air valve 625 may be coupled to a structure that remains generally fixed to the ground. In some embodiments, the two way air valve 625 may be coupled to the floor, a wall, a pillar, another support structured, etc.

Figure 7:
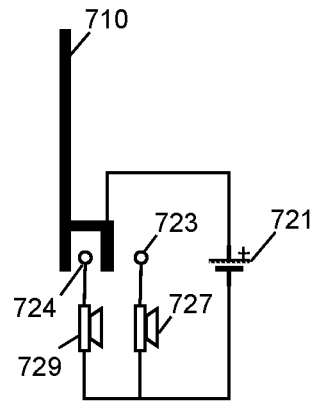

Next referring to FIG. 7, a sound emitter device comprising electrical speaker devices are shown. The sound emitter comprises an actuator 710, two contacts 724 and 723, two speakers 729 and 727 each coupled to a contact, and a power source 721. The actuator 710 may comprise one or more contacts that are coupled to the power source 721 and configured to contact the contacts 724 and 723. The actuator 710 may be actuated by direct contact with the item and/or by the movement of the support structured due to the movement of the item. When a backward force is applied to the actuator 710, the actuator 710 contacts the contact 723 and closes the circuit to power the speaker 727 to produce a sound. When a forward force is applied to the actuator 710, the actuator 710 contacts the contact 724 and closes the circuit to power the speaker 727 to produce a sound. The speakers 727 and 729 may generally be any device configured to produce a sound when power is supplied to it. In some embodiments, each speaker may be configured to produce a distinguishable sound such that the stock tracking system may determine the direction of the force applied to the support structure based on the sound characteristics of a detected sound. In some embodiments, a powered sound emitter device may comprise a single speaker coupled to the contacts 724 and 723 via different resistance such that the sound produced when the actuator 710 contacts each contact varies due to the difference in resistance. The power source 721 may be one or more of a battery, a photovoltaic cell, and a power line. In some embodiments, the sound emitter may be powered by wireless power harvesting.

FIGS. 3A-7 are provided as examples of a sound emitter device according to some embodiments only. While actuators in FIGS. 3A-7 are generally shown to apply a horizontal force, in some embodiments, the actuators may apply a downward force in response to the weight of item(s) placed on the support structure to produce a sound In some embodiments, a sound emitter device may generally be any device configured to emit a sound, having a frequency audible or inaudible to humans, based on the movement and/or weight of one or more of a support structure and an item placed and/or removed from the support structure.

Figure 8:
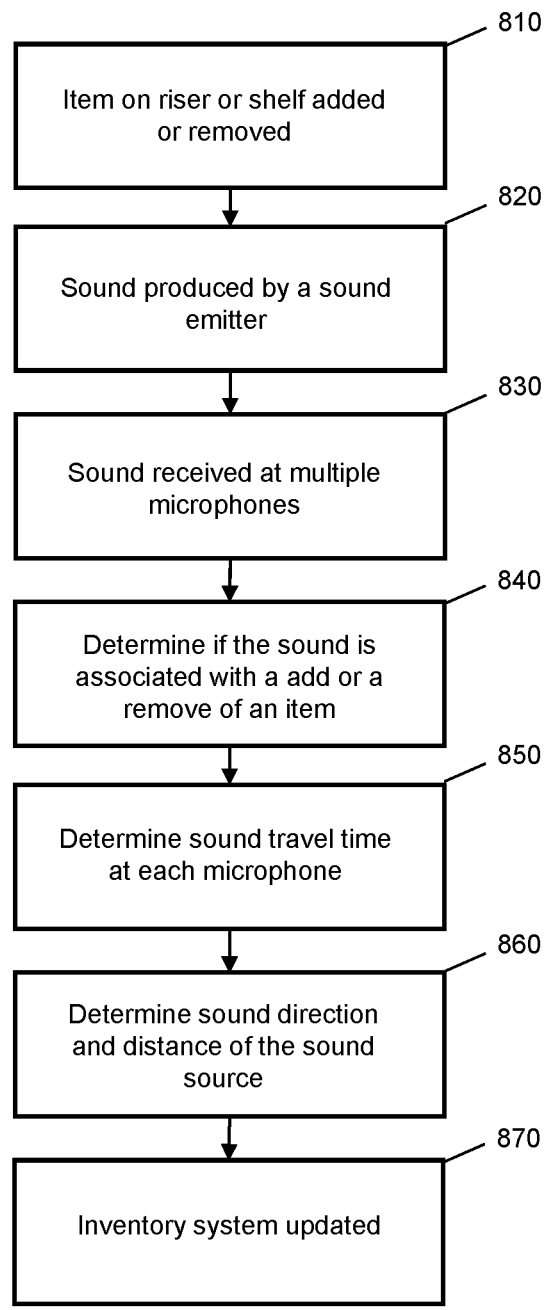
FIG. 8 is a flow diagram of a process in accordance with several embodiments.

Next referring to FIG. 8, a process for identifying an item is shown. Generally, the process shown in FIG. 8 may be implemented with a processor based device such as a control circuit, a central processor, and the like. In some embodiments, the method shown in FIG. 8 may be implemented with the control circuit 131 shown in FIG. 1.

In step 810, an item on a riser or a shelf is added or removed. In step 820, a sound is produced by a sound emitter in response to the movement in step 810. In step 830, the sound produced in step 820 is received at multiple microphones. In step 840, the system determines if the sound is associated with the addition or the removal of an item. For example, the sound emitter may be configured to produce sounds with different sound characteristics based on the detected direction of movement. In step 850, the system determines the travel time of the sound at each microphone. In some embodiments, step 850 may be based on the relative arrival time of the sound at each microphone. In step 860, the system determines the direction of the sound and a distance to the sound source. In some embodiments, step 860 may be based on performing triangulation and/or trilateration for the location of the sound source based the locations of the microphones that detected the sound in step 830. In step 870, the system updates the inventory system. In some embodiments, the system may identify a riser and/or shelf associated with the detected sound based on step 860. The inventory system for the identified riser and/or shelf may be updated according to the determination in step 840. For example, the estimated item count may be increased if movements associated with the addition of an item is detected, and the estimated item count may be decreased if movements associated with the removal of an item is detected.

In one embodiment, a system for monitoring stock information in a shopping space comprises: a support structure configured to hold a plurality of items in the shopping space, a sound emitter device configured to produce a sound in response to a movement of at least one of the support structure and an item placed on the support structure, and a sound sensor configured to capture a sound produced by the sound emitter device and transmit the sound produced by the sound emitter device to a stock tracking system.

In one embodiment, a method for monitoring stock information in a shopping space comprises: receiving sound captured by a sound sensor in the shopping space;

detecting, within the sound captured by the sound sensor, a sound produced by a sound emitter device in response to a movement of at least one of a support structure configured to hold a plurality of items in the shopping space and an item placed on the support structure, determining the support structure associated with the sound emitter, and estimating a stock information for the support structure based on tracking the sound produced by the sound emitter.

In one embodiment, a system for monitoring merchandise in a shopping space comprises: a plurality of support structures configured to hold a plurality of items in the shopping space, a plurality of sound emitter devices on the support structures configured to produce a sound at an identifiable frequency in response to a movement of at least one of the support structure and an item placed on the support structure, a sound sensor array, and a stock tracking system coupled to the sound sensor array and configured to: receive a sound captured by the sound sensor array in the shopping space, detect, within the sound captured by the sound sensor array, a sound produced by a sound emitter device of the plurality of sound emitter devices, determine a support structure of the plurality of support structures associated with the sound produced by the sound emitter, and estimate a stock information for the support structure based on tracking the sound produced by the sound emitter.

Systems, apparatuses, and methods are provided herein for collecting activity data in a shopping space. A system for collecting activity data in a shopping space comprises a sound sensor system comprising a plurality of sound sensors in the shopping space, and a control circuit communicatively coupled to the sound sensor system, the control circuit being configured to: receive sounds captured by the sound sensor system, detect a plurality of sound instances associated with sounds from customers in the sounds captured by the sound sensor system, determine a location for each of the plurality of sound instances, identify one or more alert conditions in the shopping space based on the plurality of sound instances and locations for the plurality of sound instances, and generate an alert based on the one or more alert conditions.

Generally speaking, pursuant to various embodiments, systems, apparatuses and methods are provided herein for collecting activity data in a shopping space. In some embodiments, a system for collecting activity data in a shopping space comprises a sound sensor system comprising a plurality of sound sensors in the shopping space, and a control circuit communicatively coupled to the sound sensor system. The control circuit being configured to: receive sounds captured by the sound sensor system, detect a plurality of sound instances associated with sounds from customers in the sounds captured by the sound sensor system, determine a location for each of the plurality of sound instances, identify one or more alert conditions in the shopping space based on the plurality of sound instances and locations for the plurality of sound instances, and generate an alert based on the one or more alert conditions.

Conventional retail stores typically do not have real-time data on customer traffic. Knowledge of customer activity may improve store service, on-self availability, and sales. In some embodiments, a system may determine where customer volume is high and where tasks need to be completed using sound sensors configured to measure the volume of sound in different locations of the shopping space.

Figure 9:
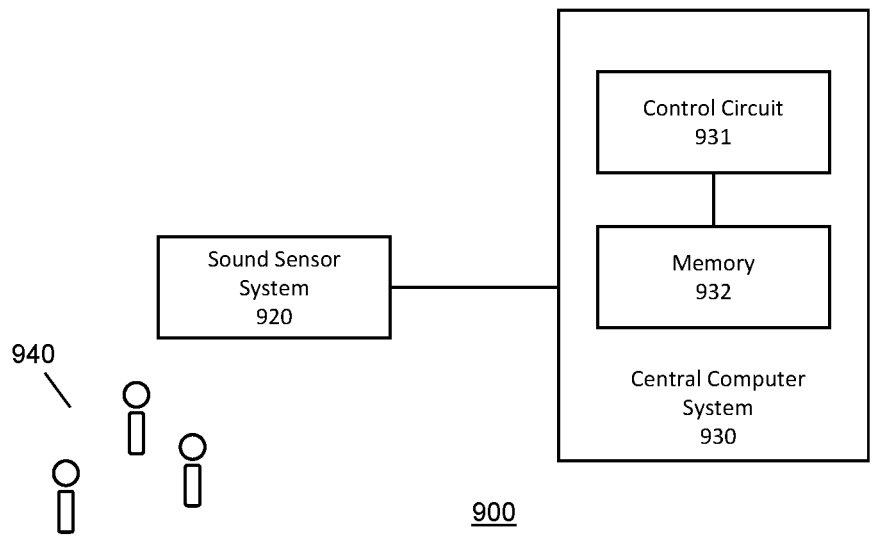
FIG. 9 is a block diagram of a system in accordance with several embodiments.

Referring now to FIG. 9, a system for collecting activity data in a shopping space is shown. The system 900 includes a central computer system 930 and a sound sensor system 920 for detecting sounds from customers 940 in a shopping space.

The sound sensor system 920 may generally be configured to capture sounds in a shopping space and transmit the captured sound to the central computer system 930. In some embodiments, the sound sensor system 920 may comprise an array of sound sensor devices positioned throughout a shopping space. In some embodiments, the sound sensor system 920 may comprise stationary sound sensors installed in the shopping space. For example, the sound sensor system 920 may be installed in the ceiling, pillars, beams, modules, display shelves, etc. of a shopping space. In some embodiments, the sound sensor system 920 may comprise sound sensor devices tuned to a narrow band of the frequencies associated with frequencies typically generated by the human footsteps and/or human voices. In some embodiments, the sound sensor system 920 may generally capture the volume of sounds in areas of a store. In some embodiments, the sound sensor system 920 may comprise one or more directional microphones including a plurality of microphone devices each pointing away from a center of the device in a different direction. The times that a sound reaches each of the microphones in the directional microphone device may be compared to determine a direction of the sound source relative to the directional microphone.

The central computer system 930 includes a control circuit 931 and a memory 932 and may generally be any processor-based device such as one or more of a computer system, a server, a networked computer, a cloud-based server, etc. The control circuit 931 may comprise a central processing unit, a processor, a microprocessor, and the like. The control circuit 931 may be configured to execute computer readable instructions stored on the memory 932. The memory 932 may comprise volatile and/or non-volatile computer readable storage memory and have stored upon it a set of computer readable instructions which, when executed by the control circuit 931, causes the system to generate alert conditions based on sounds from customers detected by the sound sensor system 920. The central computer system 930 may be coupled to the sound sensor system 920 via a wired and/or wireless signal connections. In some embodiments, the central computer system 930 may be configured to process the sound collected by the sound sensor system 920 to isolate sound instances of sounds from customers 940. In some embodiments, sounds from customers may comprise sounds associated with speech and/or footsteps. The central computer system 930 may then be configured to identify a location of the sound instance. In some embodiments, the location of a sound instance may be determined based on performing trilateration and/or triangulation for the position of the customer 940 using sounds captured by two or more directional and/or non-directional sound sensor devices of the sound sensor system 920 that are spaced apart. In some embodiments, the central computer system 930 may further be configured to determine whether the captured sound contains keywords and/or phrases spoken by customers. In some embodiments, the central computer system 930 may further determine whether an alert condition has occurred based on the collected sound instances.

In some embodiments, the central computer system 930 may be configured to automatically generate one or more alerts and/or tasks based on the detected sound instances of sounds from customers. For example, the central computer system 930 may determine one or more heavily trafficked areas based on customer sounds and instruct a motorized unit and/or a store associate to survey the area to ensure that the area is clean and/or sufficiently stocked. In another example, the central computer system 930 may determine one or more areas with unusually low traffic based on customer sounds and instruct a motorized unit and/or a store associate to investigate the area for the presence of spills or other types of obstructions. In yet another example, keywords or phrases spoken by customers may be analyzed to detect for issues in the area, such items being out of stock. Some examples of alert conditions are discussed in more detail with reference to FIGS. 10 and 12 herein. In some embodiments, data associated with customer sounds collected by the sound sensor system 920 may be used to map out and analyze usage and traffic of different areas of a shopping space over time to provide a better understanding of customer shopping patterns and habits. Contents of customer speech may also provide information on customer shopping and purchase preferences.

Figure 10:
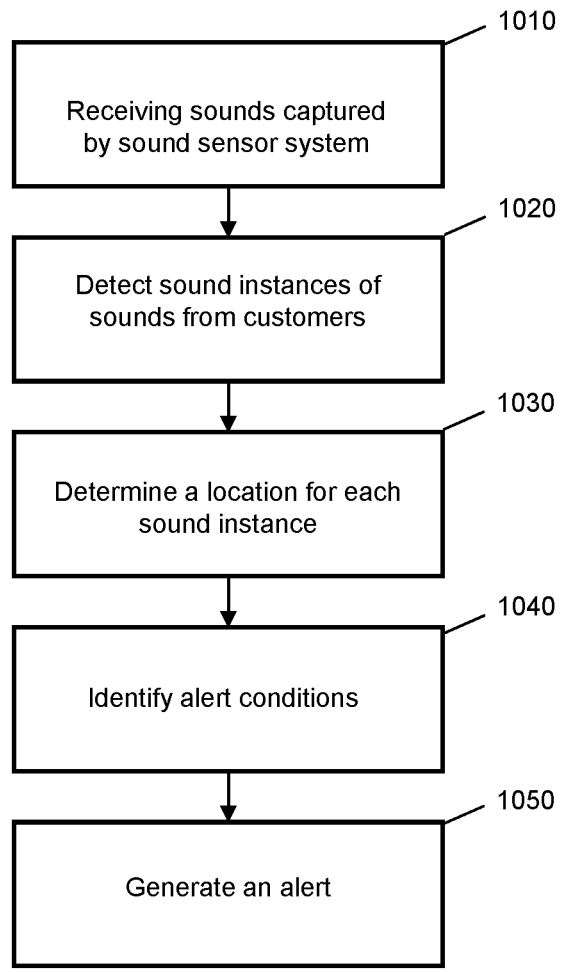
FIG. 10 is a flow diagram of a method in accordance with several embodiments.

Referring now to FIG. 10, a method for collecting activity data in a shopping space is shown. Generally, the method shown in FIG. 10 may be implemented with a processor-based device such as a control circuit, a central processor, and the like. In some embodiments, the method shown in FIG. 10 may be implemented with the central computer system 930 in FIG. 9 and one or more modules described with reference to FIG. 12.

In step 1010, the system receives sounds captured by a sound sensor system. The sound sensor system may generally be configured to capture sounds in a shopping space and transmit the sound to a central computer system. In some embodiments, the sound sensor system may comprise the sound sensor system 920 described with reference to FIG. 9. In some embodiments, the sound sensor system may comprise an array of sound sensor devices positioned throughout a shopping space. In some embodiments, the sound sensor system 920 may comprise stationary sound sensors installed in the shopping space. For example, the sound sensor system 920 may be installed in the ceiling, pillars, beams, modules, display shelves, etc. of a shopping space. In some embodiments, the sound sensor system may comprise one or more directional microphones configured to determine the direction of a sound source relative to the directional microphone. In some embodiments, in the sound sensor system may further comprise microphones on portable devices carried by one or more store associates and/or autonomous motored units.

In step 1020, the system detects sound instances associated with sounds from customers in the sounds captured by the sound sensor system in step 1010. The detected customer sound may comprise one or more of customer voice and customer footstep. In some embodiments, the sounds from customer may be associated with one or more customer talking, walking and/or interacting with personnel or store items in the shopping space. In some embodiments, each sound instance may be associated with one or more customers in a shopping space. In some embodiments, a sound instance may correspond to the collective volume of customer sounds in an area.

In some embodiments, the system may be configured to determine a baseline noise profile of the shopping space and remove a baseline noise from the sound captured by the sound sensor system to detect for sounds from customers. In some embodiments, the baseline noise profile may be generated and/or updated by capturing the ambient noise of the shopping space with the sound sensors. In some embodiments, the system may be configured to measure the sound volumes in each area of the shopping space by subtracting the baseline noise volume of the area from the captured volume. In some embodiments, the system may be configured to filter the sound captured by the sound sensors to isolate sound instances matching typical sound characteristics profiles of sounds from customers. For example, the captured sound may be filtered to remove all sounds outside of the frequencies typically associated with human speech and/or footsteps. In some embodiments, the system may be configured to determine whether a sound is from a customer based on one or more of the frequency, the tone, the modulation, the amplitude, and the duration of the captured sound.

In step 1030, the system determines a location for each of the sound instances detected in step 1030. In some embodiments, the system may be configured to determine a location of a sound instance based on the locations of sound sensors in the sound sensor system that detected the customer sound instance. In some embodiments, the location of the sound instances may correspond to an approximate area. In some embodiments, the system may be configured to determine a sound instance location based on trilateration and/or triangulation from the locations of two or more sound sensor devices. For example, if the two sensors spaced apart from each other detect a sound having a matching characteristic, the system may be configured to determine an estimated distance and/or angle between the sound source and each sound device based on the relative arrival time and/or amplitude of the sound detected at each sound sensor. In some embodiments, a direction of the sound source may be determined with:

$$\Delta t = \frac{x \sin \theta}{c},$$

in which $\Delta t$ represents arrival time difference, x represents the distance between the two sound sensors, c represents the speed of sound, and $\theta$ may be solved for the angle between the baseline of the sensors and the incident sound. In some embodiments, the determined angle from multiple sensors may be used to triangulate a point in the shopping space based on the locations of the sound sensors. In some embodiments, the system may use the amplitude of the customer sound as captured by three or more sound sensors to estimate the sound source's distances to each of the sound sensors. A location may then be estimated based on the distances from each sound sensor.

In some embodiments, the location of the sound instance may be determined based at least partially on trilateration. For example, the distances between each of the sound source and each sound sensor may be determined based on the difference in time of arrival of the detected customer sound. For example, if a sound arrives at the first sound sensor device at $t_1$ and at the second sound sensor device at $t_2$ before $t_1$, and the distance between the first and second sound sensors is $d_3$, the distance between the sound source and the first sound sensor ($d_1$) may be solved from $d_1^2 = d_3^2 + (d_1 - (t_1 - t_2)c)^2$, assuming that the distance between the sensors $d_3$ is smaller than $d_1$. The distance between the second sensor and the sound source may be represented by $d_2 = d_1 - (t_1 - t_2)c$. With $d_2$ and $d_1$, the system may determine a circle of possible points for the sound source. If customers are generally assumed to be on a plane a few feet above the floor of the shopping space, the intersection of the plane and the circle of possible points may yield two possible locations for the sound source. In some embodiments, the system may similarly calculate the distance between the sound instance location and a third sound sensor device to triangulate and narrow down the location of the sound instance.

In some embodiments, the sound sensor system may comprise one or more directional microphones having a plurality of microphones pointed in different directions. The system may determine the direction of the sound source based on the time of arrival and/or sound amplitude at each microphone device in the directional microphone. For example, the sound would first arrive at the microphone device pointed most directly at the sound source. The system may then determine a point in the shopping space based on the direction and/or distance of the sound source detected by two or more directional microphones based on either triangulation or trilateration. In some embodiments, the system may have stored in its memory a map of the shopping space indicating pathways and areas that customers may travel in. The system may use the map to further narrow down the possible locations of the sound source.

In step 1040, the system identifies alert conditions based on the detected sound instance. In some embodiments, the sound instances detected in step 1020 and sound instance locations determined in step 1030 may be aggregated to identify whether an alert condition has occurred. In some embodiments, an alert is generated based on the cumulative activity levels of different areas of the shopping determined based on a plurality of captured sound instances. For example, the system may track the customer traffic volume in different sections of a shopping space over time based on detecting sound instances and/or volumes of sound instances associated with sounds from customers. The system may then generate an alert when the estimated accumulated traffic volume of an area exceeds a predetermined threshold. A store associate and/or an autonomous unit may then be instructed to inspect the area to see if the area needs attention (e.g. restocked, cleaned, reorganized, etc.). In some embodiments, the system may measure for a volume and/or intensity of speech in a particular area based on the captured sounds. The system may generate an alert if the volume in a store area exceeds a threshold. In some embodiments, the system may detect for sections with atypically low traffic as compared to historical traffic data of the area. The system may then generate an alert and instruct a store associate and/or an autonomous unit to inspect the area to see if the area needs attention (e.g. obstructions in the aisle, spills, etc.). In some embodiments, the system may be configured to determine customer dwell locations and dwell durations based on the plurality of sound instances and identify the presences of alert conditions based on the customer dwell locations and the dwell durations. For example, the system may detect for dwell time and dwell location by tracking one or more customer's footstep sound and/or voice to determine whether the customer stops at a section of a shopping area and for how long. In some embodiment, the system may further perform a comparison of the customer dwell locations and durations with customer purchase data and generate an alert based on the comparison. For example, if one or more customers dwell at the chips sections for a prolonged period of time but makes no purchase from the chips sections at checkout, the system may generate an alert for the inspection of the chips section for potential issues. In some embodiments, the comparison of customer dwell data and purchase data may be performed by comparing a plurality of aggregated customer dwell data and storewide purchase data. In some embodiments, the system may be configured to track the locations of a customer over time to determine the point of sales terminal used by the customer at checkout to compare that particular customer's purchases with his/her in store travel and dwell data.

In some embodiments, the system may further identify one or more keywords in the sound instance of sounds from customers and generate alerts based on the content of the one or more the keyword and the key-phrase spoken by a customer In some embodiments, the identified sound instances may be processed through speech recognition algorithm to extract keywords and key-phrases. For example, keywords and key-phrases may include words and phrases such as "too expensive," too many," "not enough," "dirty," "messy," "broken," etc. Generally, keywords and key-phrases may include any customer comment that may be indicative of an issue in the shopping space (e.g. cleanliness, organization, product arrangement, etc.) and/or with products offered for sales (e.g. sizing, damages, pricing, etc.). In some embodiments, the identified keywords and key-phrases may be aggregated to detect for the presence of alert conditions in one or more locations. For example, if two or more customers say "messy" in a section of the shopping space, the system may instruct a store associate and/or an automated unit to inspect and/or clean the area. In another example, if "too many" is repeatedly expressed by customers near an item for sale, the store may consider ordering a smaller packaging size for the product (e.g. 2-pack instead of 6-pack).

In step 1050, the system generates an alert based on the one or more alert conditions. In some embodiments, the system may set a threshold level of the number of similar alert conditions detected in one area before generating an alert. In some embodiments, the alert may be sent to one or more store associate, autonomous unit, and store management. In some embodiments, an alert may correspond to a condition that needs to be addressed (e.g. items out of stock, spills, obstructions, etc.). In some embodiments, the alert may comprise an instruction to inspect and/or redress a potential issue. For example, the alert may comprise a clean-up or organization task assignment. In some embodiments, the alert may comprise a recommendation. For example, the alert may comprise a suggestion to stock different types and/or sizes of products in a section of the shopping space. In some embodiments, the alert may comprise a recommendation to adjust the stock purchase decisions of the retailer's buyers and merchandisers.

In some embodiments, steps 1010 through 1050 may be repeated continuously to monitor a shopping space by capturing sounds from customers in the shopping space. In some embodiments, the results of one or more of steps 1020-1050 may be recorded over time for analysis to determine whether modifications to the shopping space may improve customer experience and efficiency.

Figure 11:
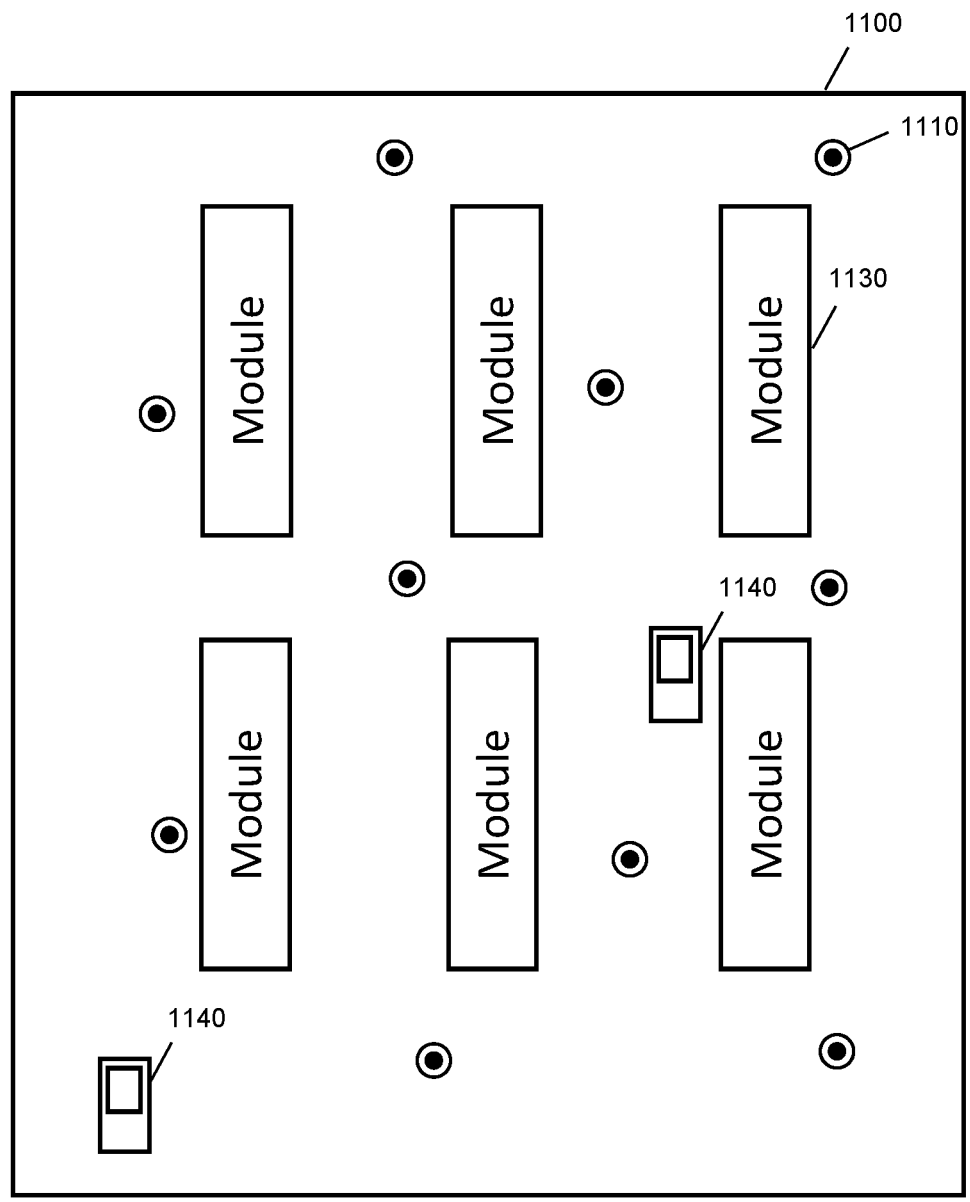
FIG. 11 is an illustration of a shopping space in accordance with several embodiments.

Next referring to FIG. 11, an illustration of a shopping space according to some embodiments is shown. The shopping space 1100 comprises a plurality of display modules 1130 and a plurality of sound sensors 1110 positioned throughout the shopping space. In some embodiments, display modules may also be referred to as modular or shelves. When one or more of the sound sensors 1110 detects sounds for customers, the system may determine a location of the sound instance based on one or more of triangulation and/or trilateration. Over time, the system may continuously update the customer sounds associated with different areas of the shopping space 1100 and/or locations associated with sounds from one or more customers. In some embodiments, each detect sound instance may be recorded with a time stamp such that the system records the speed and dwell time of the customer at each location. In some embodiments, the system may further detect for keywords and/or key-phrases spoken by customers at various locations in the shopping space 1100. The system may then aggregate the detected sound instances associated with sounds from customers to detect for alert conditions. The system may then generate alerts based on the alert conditions.

In some embodiments, generated alerts may be sent to portable devices 1140 carried by a store associated or on an autonomous motored unit and/or a management terminal. An alert may comprise an instruction to perform a task to redress the alert condition and/or a recommendation to modify the shopping space and/or items for sale. In some embodiments, one or more portable devices 1140 may further comprise a sound sensor that may also detect for customer sounds. The customer sounds captured by portable devices 1140 may be processed similarly as the sounds captured by the stationary sound sensors 1110 to detect for alert conditions.

Figure 12:
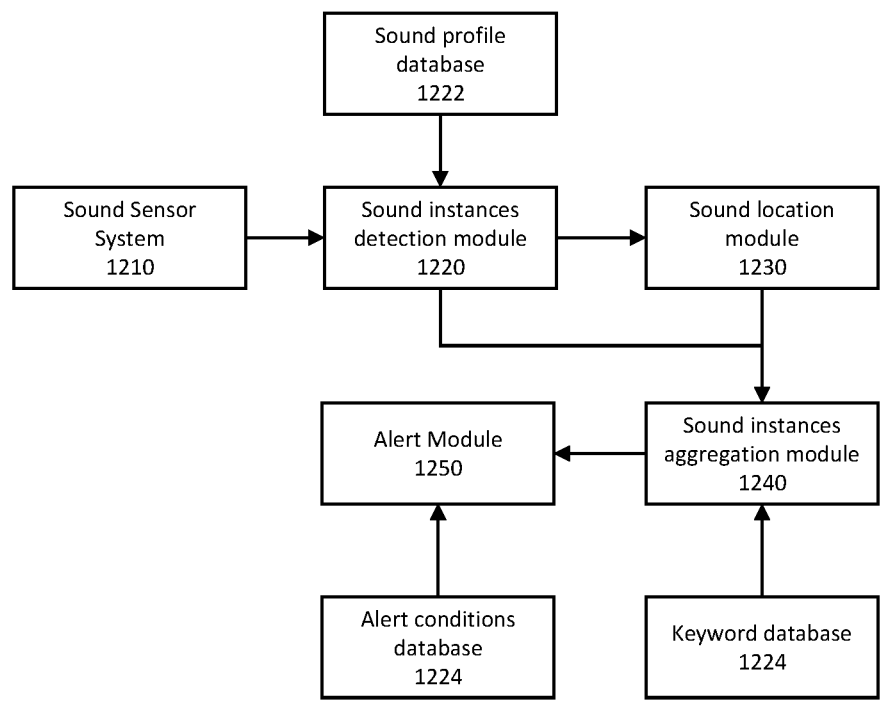
FIG. 12 is a block diagram of a process in accordance with several embodiments.

Next referring to FIG. 12, a process according to some embodiments is shown. In FIG. 12, sounds captured by a sound sensor system 1210 are processed to detect for alert conditions and generate alerts in a shopping space. The sound sensor system 1210 may generally comprise sound sensors positioned in a shopping space. The captured sounds are processed through a sound instance detection module 1220 to isolate out sounds associated with customer activity in a shopping space. For example, the sound instance detection module 1220 may be configured to detect for sounds associated with footsteps and/or human speech. In some embodiments, sound instance detection module 1220 may detect for sound instances of interest based on comparing the captured sounds with sound profiles in the sound profile database 1222. The sound profile database 1222 may store profiles of sounds typically associated with sounds from customers such as footsteps and speech. For example, the sound profile database 1222 may store information on frequencies, tones, modulations, amplitudes, durations etc. of sounds that are indicative of sounds from customers.

The detected sound instances may be sent to sound location module 1230 to determine a location associated with the sound instance. The sound location module 1230 may be configured to determine a location and/or area of a sound instance based on the locations(s) sound sensor devices that detected matching sound instances. In some embodiments, the locations of sound instances may be determined by one or more triangulation and trilateration.

The sound instances aggregation module 1240 may then aggregate the detected sound instances and locations. In some embodiments, the sound instances may be aggregated based on the locations associated with the sound instances. For example, the one time and/or cumulative customer sound levels of one area may by tracked to determine whether an area is heavily trafficked and/or may need attention. In some embodiments, sound instances may be aggregated based on sound type and/or keywords spoken by customers. In some embodiments, the sound instances aggregation module 1240 may perform voice recognition to detect for one or more keywords and/or key-phrases spoken by customers using a keyword database 1242. For example, the sound instances aggregation module 1240 may separately keep track of how many times the each keyword, such as "messy" and "expensive," are spoken in each area. In some embodiments, the sound instances aggregation module 1240 may track the path of one or more customers by aggregating determined locations of customer sounds.

The alert module 1250 may be configured to use the sound instances aggregated by the sound instances aggregation module 1240 to determine whether an alert should be generated. In some embodiments, the alert module 1250 may compare the aggregated sound instances with the information in the alert conditions database 1252 to determine whether an alert should be generated. The alert conditions database 1252 may store trigger conditions corresponding to a plurality of alerts. For example, the alert conditions database 1252 may specify that if the word "dirty" is spoken for a set number of times in an area, a clean-up alert may be triggered. In another example, the alert conditions database 1252 may specify that if the one-time and/or cumulative sound level in one area exceeds a threshold specified in the alert conditions database the alert module 1250 should generate an alert.

In some embodiments, the modules described with reference to FIG. 12 may comprise software and/or hardware modules. In some embodiment, functions of the modules may be performed by a processor-based device such as the control circuit 931 described with reference to FIG. 9 herein.

In one embodiment, a system for collecting activity data in a shopping space comprises a sound sensor system comprising a plurality of sound sensors in the shopping space, and a control circuit communicatively coupled to the sound sensor system. The control circuit being configured to: receive sounds captured by the sound sensor system, detect a plurality of sound instances associated with sounds from customers in the sounds captured by the sound sensor system, determine a location for each of the plurality of sound instances, identify one or more alert conditions in the shopping space based on the plurality of sound instances and locations for the plurality of sound instances, and generate an alert based on the one or more alert conditions.

In one embodiment, a method for collecting activity data in a shopping space comprises receiving, by a control circuit, sounds captured by a sound sensor system comprising a plurality of sound sensors in the shopping space, detecting, at the control circuit, a plurality of sound instances associated with sounds from customers in the sounds captured by the sound sensor system, determining, by the control circuit, a location for each of the plurality of sound instances, identifying, by the control circuit, one or more alert conditions in the shopping space based on the plurality of sound instances and locations for the plurality of sound instances, and generating, by the control circuit, an alert for the one or more alert conditions.

In one embodiment, an apparatus for collecting activity data comprises: a non-transitory storage medium storing a set of computer readable instructions and a control circuit configured to execute the set of computer readable instructions which causes to the control circuit to: receive sounds captured by a sound sensor system comprising a plurality of sound sensors in the shopping space, detect a plurality of sound instances associated with sounds from customers in the sounds captured by the sound sensor system, determine a location for each of the plurality of sound instances, identify one or more alert conditions in the shopping space based on the plurality of sound instances and locations for the plurality of sound instances, and generate an alert for the one or more alert conditions.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for monitoring stock information in a shopping space comprising:
   a support structure configured to hold a plurality of items in the shopping space;
   a sound emitter device configured to produce a sound in response to a movement of at least one of the support structure and an item placed on the support structure; and
   a sound sensor configured to capture the sound produced by the sound emitter device and transmit the sound produced by the sound emitter device to a stock tracking system;
   wherein the sound emitter device comprises a first compressible diaphragm configured to produce a first sound having a first frequency when compressed and released by the movement of at least one of the support structure and the item placed on the support structure in a first direction.

2. The system of claim 1, wherein the sound emitter device is configured to produce a first sound when a movement in a first direction is detected and produce a second sound when a motion in a second direction opposite the first direction is detected.

3. The system of claim 1, wherein the sound emitter device is configured to emit a sound having a frequency inaudible to humans.

4. The system of claim 1, wherein the sound emitter device is configured to emit a sound having a specific frequency, and the stock tracking system is configured to identify the support structure from a plurality of support structures based on the specific frequency of the sound produced by the sound emitter device.

5. The system of 1, wherein the sound emitter device further comprises a second compressible diaphragm configured to make a second sound having a second frequency when compressed and released by the movement of at least one of the support structure and the item placed on the support structure in a second direction.

6. A system for monitoring stock information in a shopping space comprising:
a support structure configured to hold a plurality of items in the shopping space;
a sound emitter device configured to produce a sound in response to a movement of at least one of the support structure and an item placed on the support structure; and
a sound sensor configured to capture the sound produced by the sound emitter device and transmit the sound produced by the sound emitter device to a stock tracking system;
wherein the sound emitter device comprises a pair of contacts configured to supply power to a speaker device when actuated by the movement of at least one of the support structure and the item placed on the support structure.

7. A system for monitoring stock information in a shopping space comprising:
a support structure configured to hold a plurality of items in the shopping space;
a sound emitter device configured to produce a sound in response to a movement of at least one of the support structure and an item placed on the support structure; and
a sound sensor configured to capture the sound produced by the sound emitter device and transmit the sound produced by the sound emitter device to a stock tracking system;
wherein the sound emitter device comprises an airbladder configured to produce a sound through an air valve when actuated by the movement of at least one of the support structure and the item placed on the support structure.

8. The system of claim 1, wherein the sound sensor comprises a plurality of sound sensors placed around the shopping space.

9. The system of claim 1, further comprising the stock tracking system is configured to estimate a number of items on the support structure based on monitoring sounds captured by the sound sensor.

10. The system of claim 9, wherein the stock tracking system is configured to determine a baseline noise profile of the shopping space and remove a baseline noise from the sound captured by the sound sensor to detect the sound produced by the sound emitter device.

11. The system of claim 9, wherein the stock tracking system is configured to determine whether a sound is produced by the sound emitter device based on a frequency and a duration of the sound detected by the sound sensor.

12. The system of claim 9, wherein the stock tracking system is configured to determine a location of the sound emitter device based on one or more of triangulation and trilateration.

13. The system of claim 9, wherein the stock tracking system is configured to detect a sound of a damage event to an item based on the sound detected by the sound sensor.

14. A method for monitoring stock information in a shopping space comprising:
receiving sound captured by a sound sensor in the shopping space;
detecting, within a sound captured by the sound sensor, a sound produced by a sound emitter device in response to a movement of at least one of a support structure configured to hold a plurality of items in the shopping space and an item placed on the support structure;
determining the support structure associated with the sound emitter device; and
estimating a stock information for the support structure based on tracking the sound produced by the sound emitter device;
wherein determining the support structure comprises determining a location of the sound emitter device based on one or more of triangulation and trilateration.

15. The method of claim 14, wherein determining the support structure comprises determining a frequency of the sound produced by the sound emitter device.

16. The method of claim 14, wherein detecting the sound produced by the sound emitter device comprises determining a baseline noise profile of the shopping space and removing a baseline noise from the sound captured by the sound sensor to detect the sound produced by the sound emitter device.

17. The method of claim 14, wherein detecting the sound produced by the sound emitter device is based on determining a frequency and a duration of the sound captured by the sound sensor.

18. A system for monitoring merchandise in a shopping space comprising:
a plurality of support structures configured to hold a plurality of items in the shopping space;
a plurality of sound emitter devices on the plurality of support structures configured to produce a sound at an identifiable frequency in response to a movement of at least one of a support structure and an item placed on the support structure;
a sound sensor array; and
a stock tracking system coupled to the sound sensor array and configured to:
receive a sound captured by the sound sensor array in the shopping space;
detect, within the sound captured by the sound sensor array, the sound produced by a sound emitter device of the plurality of sound emitter devices;
determine a support structure of the plurality of support structures associated with the sound produced by the sound emitter device; and
estimate a stock information for the support structure based on tracking the sound produced by the sound emitter device.

* * * * *

UNITED STATES PATENT AND TRADEMARK OFFICE
CERTIFICATE OF CORRECTION

PATENT NO. : 10,586,205 B2
APPLICATION NO. : 15/395478
DATED : March 10, 2020
INVENTOR(S) : Robert J. Taylor et al.

It is certified that error appears in the above-identified patent and that said Letters Patent is hereby corrected as shown below:

In the Claims

Claim 5, Column 21, Line 3, after "of" insert --claim--.

Signed and Sealed this
Eleventh Day of August, 2020

Andrei Iancu
*Director of the United States Patent and Trademark Office*